United States Patent [19]

Vicino

[11] E Patent Number: Re. 33,709

[45] Reissued Date of Patent: Oct. 8, 1991

[54] INFLATABLE SIGN

[76] Inventor: Robert K. Vicino, 6330 Nancy Ridge Dr., San Diego, Calif. 92121

[21] Appl. No.: 375,310

[22] Filed: Jul. 3, 1989

Related U.S. Patent Documents

Reissue of:

[64] Patent No.: 4,776,121
Issued: Oct. 11, 1988
Appl. No.: 42,743
Filed: Apr. 27, 1987

[51] Int. Cl.[5] ..... G09F 15/00

[52] U.S. Cl. ..... 40/610; 40/603; 40/624

[58] Field of Search ..... 40/603, 610, 624, 214, 40/215, 604, 212, 554, 571; 160/58, 378; 52/2 B, 2 C, 2 D, 74

[56] References Cited

U.S. PATENT DOCUMENTS

| | | | |
|---|---|---|---|
| 2,816,378 | 12/1957 | Levinson | 40/541 |
| 3,303,615 | 2/1967 | O'Neal | 52/2 C |
| 3,670,440 | 6/1972 | Yost | 40/215 |
| 4,045,925 | 9/1977 | O'Neal | 52/2 C |
| 4,369,591 | 1/1983 | Vicino | 40/610 |
| 4,372,071 | 2/1983 | Vicino | 40/603 |
| 4,447,974 | 5/1984 | Vicino et al. | 40/214 |
| 4,510,708 | 4/1985 | Pokrinchak | 40/152.2 |
| 4,692,847 | 9/1987 | Gandy | 160/378 |

*Primary Examiner*—Cary E. Stone
*Attorney, Agent, or Firm*—Henri J. A. Charmasson

[57] ABSTRACT

A self-contained inflatable sign for temporary attachment to prominent portions of structures to provide a highly visible message day or night. The sign is an envelope made from translucent flexible panels which is inflated by a blower within the envelope which also contains a series of lights. A message banner is interchangeably held onto the envelope. When inflated the envelope becomes a strong illuminated sign capable of withstanding severe outdoor environments but light enough to be quickly and easily erected on highly visible but otherwise difficult to access portions of buildings or structures. An alternate version is specifically designed for mounting against the front of a commercial building as a marquee-type display.

21 Claims, 3 Drawing Sheets

INFLATABLE SIGN

Matter enclosed in heavy brackets [ ] appears in the original patent but forms no part of this reissue specification; matter printed in italics indicates the additions made by reissue.

FIELD OF THE INVENTION

This invention relates to signs, and more specifically, illuminated signs.

BACKGROUND OF THE INVENTION

Illuminated signs whether they are used indoors or outdoors are intended to provide high visibility at all hours of the day and principally at night. The traditional method has been to construct a box-like metallic frame with one or two message-carrying faces made from translucent glass or plastic material. Illumination is provided by strong lights built inside the box-like frame. The message is usually changed by either replacing the entire translucent faces or by substitution of removable types which adhere to the illuminated faces. Outdoor signs which require a large message area and indoor signs of more than one square meter of display surface require elaborate structural framework in order to support the display surface material, and to withstand the action of the wind. As a result this type of sign is seldom movable. Marquee-type illuminated signs which are installed on the faces of buildings also require elaborate anchoring and supporting frameworks which render them expensive to install and difficult to modify.

All these drawbacks make it practically impossible to construct temporary or highly mobile illuminated signs of any size suitable for outdoor use.

SUMMARY OF THE INVENTION

The invention offers a fresh approach to the construction of large illuminated signs by using air pressure and fluid-tight envelopes made of light material in place of structural frameworks made from metals and other heavy elements. The principal and secondary objects of this invention are:

to provide a low cost, structurally self-supporting back-lit sign for outside display;

to provide flexibility in sign mounting requirements;

to eliminate the need for external sign illumination;

to provide large signs which are light and can be collapsed into a compact package for shipping or storage;

to provide a quick and inexpensive method for changing the message displayed on such signs; and to provide a convenient method for installing permanent marquee-type displays on the front of commercial establishments.

These and other objects are met by combining an inflatable translucent container, banner, blower and internal lights. The blower and container provides a pressurized structure to withstand severe outside environments and which can be attached to a variety of structures. The translucent skin and internal lighting highlight and illuminate the banner without the need for external lighting. The banner is interchangeable to quickly provide new messages.

DESCRIPTION OF THE PREFERRED EMBODIMENT OF THE INVENTION

Figures 1, 2:
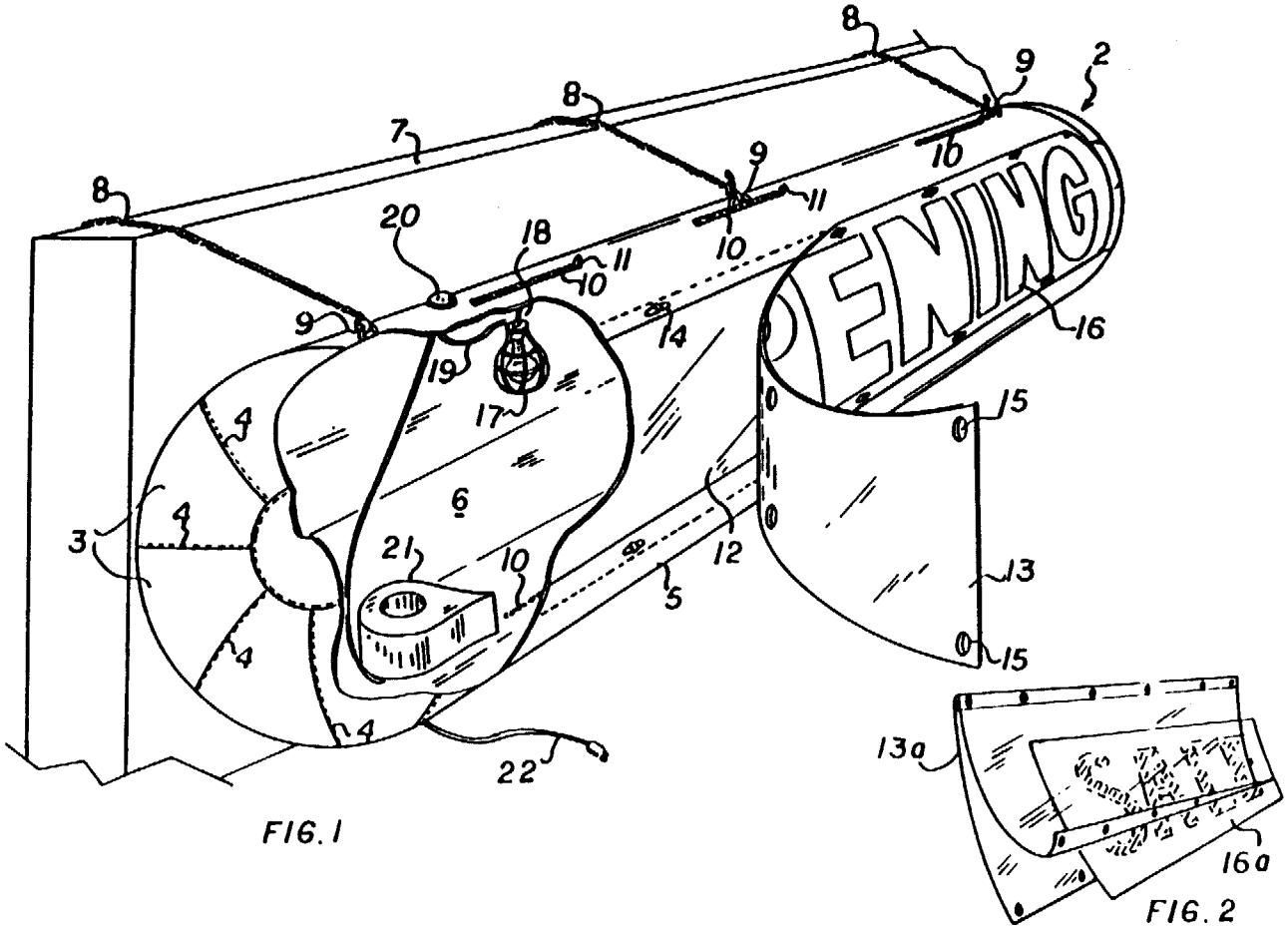
FIG. 1 is a perspective view of a first embodiment of the invention with cutouts exposing the inside configuration.
FIG. 2 is a perspective view of an alternate type of banner.

Referring now to the drawings, and beginning with FIG. 1, an inflatable sign 2 is shown made from sheets 3 of woven or laminated fabric such as vinyl-coated nylon, polyester or other pliable material. These sheets are sewn or bonded along seams 4 to form an envelope 5 which defines a closed chamber 6 when the envelope is inflated. The sign 2 is supported from a wall, panel or other similar structure 7 by ropes or cables 8 which engage D-rings 9 secured to the outside surface of the envelope 5. Slots 10 cut through the material forming the envelope along the top or bottom are closed by slide fasteners 11. These slots and fasteners located at convenient intervals provide access ports to the chamber 6 for installation and repair of the internal equipment. The sheet material is preferably translucent except for a window area 12 formed with a transparent plastic or similar material. A banner 13 made from the same material as the main body of the envelope 5 has a size commensurate with the window 12, and can be removably affixed over the window 12 by means of twist-lock fasteners 14 installed around the periphery of the window 12 and engaging eyelets 15 along the edges of the banner 13. The banner 13 carries a graphic message 16 which may be an advertisement, a trade name or the like. One or more light fixtures 17, each consisting of a light bulb within a cage, are suspended inside the envelope from suspension rings 18 attached to the ceiling of the chamber 6. The cage prevents contact between the envelope fabric and the hot bulb in case of sudden partial or total deflation, and protects the bulb during shipment and handling of the collapsed sign. The electrical wiring 19 supplying the light fixtures 17 is run through a light-sensitive switch 20 which supplies current to the light fixtures 17 when the level of outside light decreases below a certain threshold. The use of several light fixtures 17 suspended at regular intervals within the envelope provide for an even illumination of the sign without shadows or bright spots. A squirrel-cage blower 21 installed on the floor of the chamber 6 draws ambient air from the outside of the envelope through an opening (not shown) in the floor of the chamber. The capacity of the blower is sufficient to overcome the air leaks through the seams 4 between the sheets 3 and through the slide fasteners 11, and to maintain a static pressure inside the chamber 6 in excess of the ambient atmospheric pressure. The blower 21 and light fixture 17 are energized by means of a power cord which passes through an eyelet in the walls of the envelope 5. It can now be understood that the amount of light passing through the window and banner assembly is not affected by the transparent window 12 so that the translucency of the sign is homogeneous throughout the envelope except for the area of the banner 13 covered by the graphic message 16. Therefore the removable banner 13 offers a way to quickly change the message carried by the sign without affecting the general appearance of the inflatable sign 2. Although, the illustrated embodiment shows a horizontal sign suspended from a billboard-like panel, it should be understood that the sign may be suspended vertically or in any oblique position from a wall, post, tree or any combination of the above. The above-described embodiment of the invention provides a convenient sign which can be conveniently folded and carried in a small container, rapidly deployed and installed by anchoring to any convenient structure, and blown up to create a sign of extremely high visibility.

FIG. 2 illustrates an alternate embodiment of the transparent banner 13a wherein a replaceable sheet of paper 16a or plastic is sandwiched between two layers of transparent and durable mylar material joined at the top only. A new message copy can conveniently be installed and clasped into position in minutes by engaging the pripheral eyelets 15 around the twist-lock fasteners 14 about the window area 12.

Figure 4:
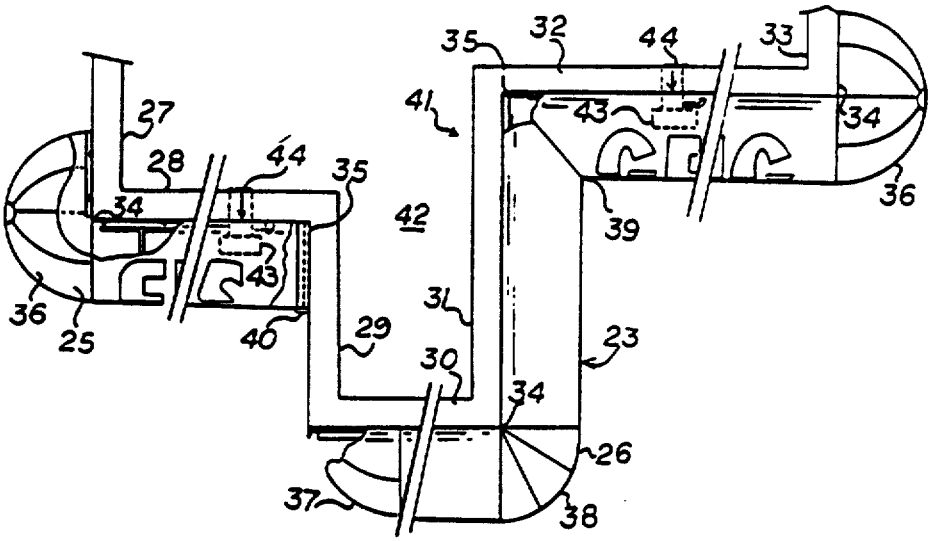
FIG. 4 is a top plan view thereof.
Figure 3:
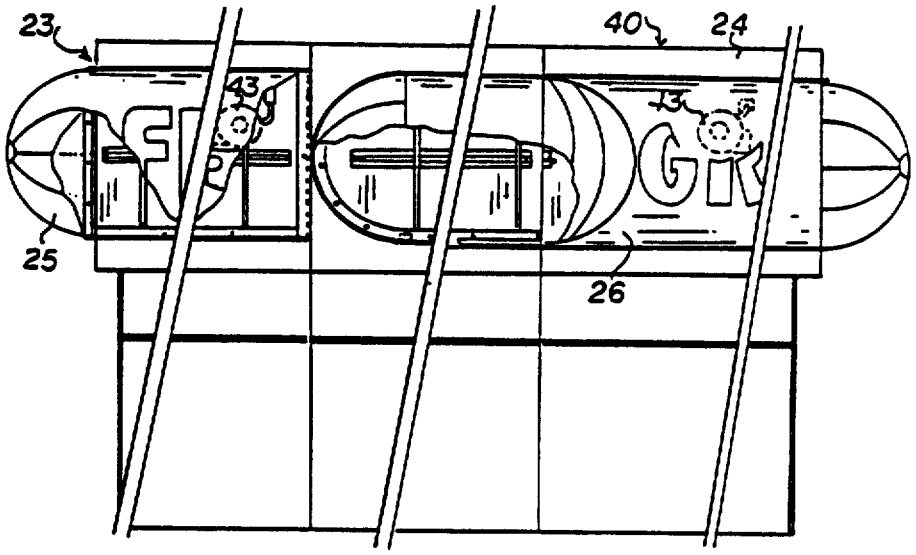
FIG. 3 is a partial front elevational view of a building equipped with a second embodiment of the invention.
Figure 5:
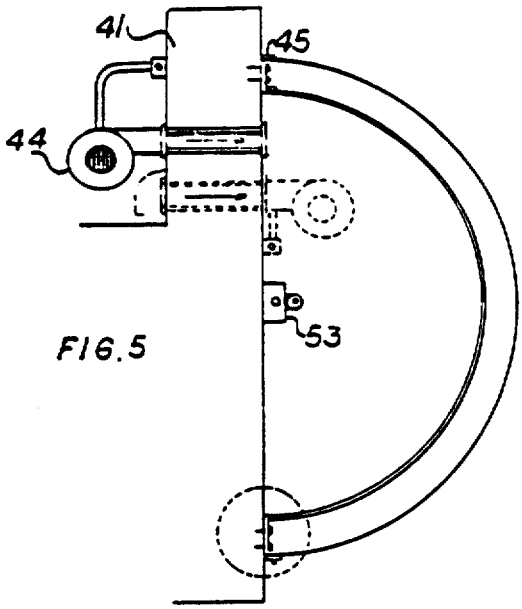
FIG. 5 is a diagrammatical cross-sectional view of the second embodiment of the invention.
Figure 7:
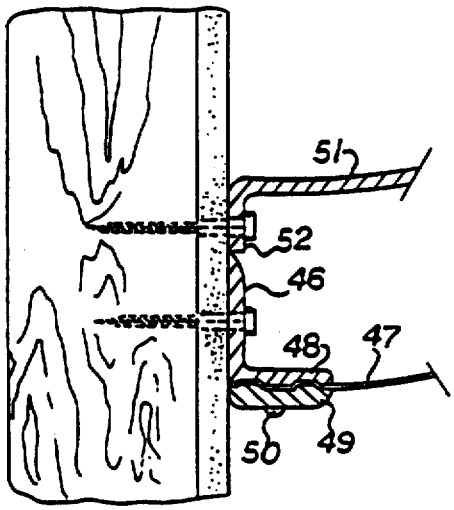
FIG. 7 is an enlarged cross-sectional view taken along line 7—7 of FIG. 6.
Figure 6:
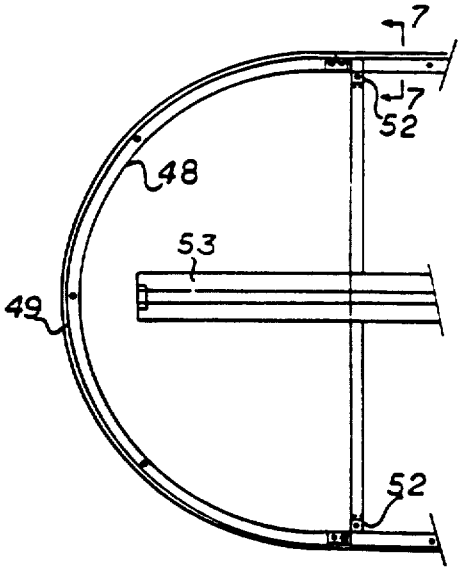
FIG. 6 is a partial view of the framing.

Turning now to FIGS. 3 through 7 of the drawing, a second embodiment of the invention will be described. FIGS. 3 and 4 illustrate a series of permanently-installed inflatable signs 23 forming a marquee around the upper fringe of the facade of a building 24. These signs 23 are made from several envelopes 25, 26 made from sheets of translucent, pliable material according to the priciples used in the manufacture of the first-described embodiment of the invention. The envelopes 25 and 26 are attached along their periphery to sections of the walls 27 through 33 which form said facade, to create an inflatable chamber between said envelopes and said sections of walls. The envelopes 25 and 26 are sized and dimensioned to form a semi-cylindrical sign which spans the convex angles 34 and concave angles 35 formed by the various walls 27 through 33 by means of wrap-around ends 36, cap end 37, elbow 38, miter corner 39 and butt end 40. In the described embodiment, the wall sections supporting the sign are formed by the parapet 41 which crowns the edges of the roof 42. It should be understood, however, that this supporting wall could also be fulfilled by any portion of a wall or by a panel or board applied against a wall. The blowers are mounted inside the envelopes 25, 26 and against the walls 28, 32, and draw air into the envelope through openings 44 practiced through said walls. Alternately the blowers 43 could be mounted behind the parapet 41 as illustrated in FIG. 5 or against the floor of the envelope as in the first embodiment. FIGS. 5, 6 and 7 illustrate one of the possible methods of attachment of the envelopes to the walls. A mounting frame 45 made from angle iron stock 46 is first bolted to the walls following the outline of the sign. The edges of the envelope 47 are captured between the portion 48 of the angle iron which extends orthogonally from the wall and clamping rails 49 which are secured to said portion by screws 50. In certain applications it may be practical to install wood strips against the wall to which the edges of the envelope can be stapled. Arcuate braces 51 are mounted orthogonally against the walls at variable intervals inside the signs and are shaped and dimensioned to closely follow the outline of the envelopes 25, 26 when they are fully inflated. The braces, however, remain spaced-apart from the skin of the inflated envelope in order to prevent shadows. These braces 51 are designed to maintain the general semi-cylindrical shape of the signs in case of loss of power and deflation of the envelopes. Another type of extrusion or a wooden rail could be used in lieu of the angle iron stock 46 to which both the clamping rails 49 and the ends 52 of the braces 51 could be secured. Florescent light fixtures 53 are mounted against the wall inside the envelope and are energized in the same manner as previously explained in the description of the first embodiment of the invention. It should be understood that this method of attachment allows for a great variety in the shape and dimension of the inflatable signs by varying the shapes and colors of the various sheets of material. This second embodiment of the invention lends itself to the use of banner and window assemblies as previously described.

Although the two above disclosed embodiments of the invention have been characterized as signs, it should be understood that they can also act as lighting or decorative fixtures with or without graphic display.

While the preferred embodiments of the invention have been described and modifications have been suggested, other embodiments may be devised without departing from the spirit of the invention and the scope of the appended claims.

What is claimed is:

1. An inflatable sign attachable to a building or the like which comprises:

a [sheet] *film* of transparent pliable material;

an envelope made from at least one sheet of pliable translucent material attached to said *film of* transparent material proximate to the edges of said [materials] *film* and forming an inflatable chamber [having seams and at least one resealable access port], said *film of* transparent material forming a window in said envelope;

means for forcing fluid [through said access port] into said envelope [in excess of any fluid losses through said seams and access port] and for maintaining in the interior of said envelope a pressure in excess of the ambient atmospheric pressure;

means for illuminating said interior;

a display banner made of pliable translucent material commensurate with said window and means for removably affixing said banner over said window; and means for supporting said envelope from said building.

2. The inflatable sign claimed in claim 1, wherein said means for forcing fluid is [as] *an* air blower.

3. An inflatable sign attachable [to a] to a building or the like which comprises:

a [sheet] *film* of transparent pliable material;

an envelope made from at least one sheet of pliable translucent material attached to said *film of* transparent material proximate to the edges of said [material] *film* and forming an inflatable chamber having seams and at least one resealable access port, said *film of* transparent material forming a window in said envelope;

means for forcing fluid through [said at least one access port] *an opening* into said envelope in excess of any fluid losses through said seams and at least one access port and for maintaining in the interior of said envelope a pressure in excess of the ambient atmospheric pressure;

means for illuminating said interior;

a display banner bearing graphic symbols made of pliable translucent material having the same translucency as the material of said at least one translucent sheet commensurate with said window and means for removably affixing said banner over said window; and means for supporting said envelope from said building.

4. The inflatable sign claimed in claim 3 which comprises a portion of a rigid and generally planar structure to which the edges of the envelope are intimately attached so that said portion forms a peripheral wall section of said chamber.

5. The inflatable sign claimed in claim 4, wherein said planar structure is a wall of said building.

6. The inflatable sign claimed in claim 4, wherein said planar structure is a board.

7. The inflatable sign claimed in claim 4, wherein said planar structure is a roof parapet on said building.

8. The inflatable sign claimed in claim 3, wherein said access port comprises a slot in said envelope and a slide fastener closing said slot.

9. The inflatable sign claimed in claim 3, wherein said means for illuminating comprise at least one light fixture comprising a bulb, a wire cage surrounding it, and a support harness, said fixture being suspended within the central portions of said chamber, said light fixture placed and dimensioned to illuminate said banner without significant bright spots and shadows.

10. An inflatable sign attachable [to a] to a building or the like which comprises:

an envelope made from at least one sheet of pliable translucent material and forming an inflatable chamber [having seams and at least one resealable access port];

means for forcing fluid [through said at least one access port] into said envelope [in excess of any fluid losses through said seams and at least one access port] and for maintaining in the interior of said envelope a pressure in excess of the ambient atmospheric pressure;

means for illuminating said interior;

a window in said envelope formed by a transparent section of pliable material;

a banner bearing graphic symbols made of pliable translucent material on the outer face of said envelope having the same translucency as the material as said at least one translucent sheet, said banner being made from a cut of pliable translucent material commensurate with said window and means for removably affixing said banner over said window;

a rigid and generally planar structure which a portion of said translucent material of the envelope is intimately attached so that said portion forms a peripheral wall section of said chamber;

braces extending from said portion of planar structure into said chamber, said braces being shaped and dimensioned to generally follow the geometry of the inner face of said envelope when said envelope is inflated; and means for supporting said envelope from said building.

11. The inflatable sign claimed in [cliam] *claim* 10, wherein said means for forcing fluid is an air blower mounted on said planar structure and admitting air into said envelope through an opening into said planar structure.

12. An inflatable sign attachable to a building or the like which comprises:

an envelope made from at least one sheet of pliable translucent material and forming an inflatable chamber having seams and at least one resealable access port;

means for forcing fluid through [said at least one access port] *an opening* into said envelope in excess of any fluid losses through said seams and at least one access port and for maintaining in the interior of said envelope a pressure in excess of the ambient atmospheric pressure;

means for illuminating said interior;

a window in said envelope formed by a transparent section of pliable material;

a banner bearing graphic symbols made of pliable translucent material on the outer face of said envelope having the same translucency as the material as said at least one translucent sheet, said banner being made from a cut of pliable translucent material commensurate with said window and means for removably affixing said banner over said window;

a rigid and generally planar structure to which a portion of said translucent material of the envelope is intimately attached so that said portion forms a peripheral wall section of said chamber;

parts of at least two abutting walls, each wall being in a different plane whereby said portion define an angular surface; and means for supporting said envelope from said building.

13. The inflatable sign claimed in claim 12, wherein said envelope spans said angular surface.

14. The inflatable sign claimed in claim 13, wherein said walls define a convex angular surface.

15. The inflatable sign claimed in claim 13, wherein said walls define a concave angular surface.

16. An inflatable sign attachable to a building or the like which comprises:

an envelope made from at least one sheet of pliable translucent material and forming an inflatable chamber [having seams and at least one resealable access port];

means for forcing fluid [through said access port] into said envelope [in excess of any fluid losses through said seams and access port] and for maintaining in the interior of said envelope a pressure in excess of the ambient atmospheric pressure;

means for illuminating said interior;

a display made of pliable translucent material on the outer face of said envelope wherein graphic symbols are applied to the face of said envelope;

a window in said envelope formed by two layers of transparent pliable material;

a banner bearing graphic symbols, said banner being sandwiched between two layers; and means to support said envelope from said building.

*17. An inflatable sign attachable to a building or the like which comprises:*

*an envelope made from at least one sheet of pliable translucent material and forming an inflatable chamber;*

*a sealed window defined over a portion of said envelope;*

*means for forcing fluid into said envelope and for maintaining in the interior of said envelope a pressure in excess of ambient atmospheric pressure;*

*means for illuminating said interior;*

*a display banner commensurate with said window, wherein the combined opacity of said window and banner is substantially equal to the opacity of said material; and*

*means for supporting said envelope from said building.*

*18. The inflatable sign claimed in claim 17, wherein said means for forcing fluid into said envelope comprises an air blower.*

*19. An illuminated sign which can be attached or suspended from a stationary structure such as a building, which comprises:*

*an inflatable envelope made from pliable, translucent, laminar material and forming, when inflated, a generally hollow and erect tubular body;*

*a blower connected to said envelope and forcing sufficient ambient air therein to maintain an internal pressure in excess of ambient atmospheric pressure;*

*at least one light fixture and means for suspending said light fixture inside said envelope;*

*said envelope having at least one access slot and means for releasably closing said slot;*

*a message-carrying banner mounted against an external section of said tubular body, said tubular body having an axial length in excess of its cross-sectional diameter; and*

*wherein said body is closed at each of its opposite axial ends by a rounded cap integral with said envelope.*

*20. The illuminated sign of claim 19, wherein said banner comprises an oblong sheet of pliable material having its longest dimension generally commensurate with the axial length of said tubular body, and its shortest dimension generally commensurate with one-fourth of the circumference of said tubular body.*

*21. An illuminated sign which can be attached or suspended from a stationary structure such as a building, which comprises:*

*an inflatable envelope made from pliable, translucent, laminar material and forming, when inflated, a generally hollow and erect tubular body;*

*a blower connected to said envelope and forcing sufficient ambient air therein to maintain an internal pressure in excess of ambient atmospheric pressure;*

*at least one light fixture and means for suspending said light fixture inside said envelope;*

*said envelope having at least one access slot and means for releasably closing said slot;*

*a message-carrying banner mounted against an external section of said tubular body; and* a rigid and generally planar structure to which said pliable translucent material of the tubular body is intimately attached, a portion of said planar structure forming part of said envelope.

* * * * *